May 20, 1969      A. J. MIKO      3,445,698
DYNAMOELECTRIC MACHINE WITH JUNCTION BOX ON YOKE AND END BELL
Filed June 29, 1967      Sheet 1 of 2

INVENTOR.
ALBERT J. MIKO
BY Woodling, Krost,
Granger and Rust
ATTORNEYS.

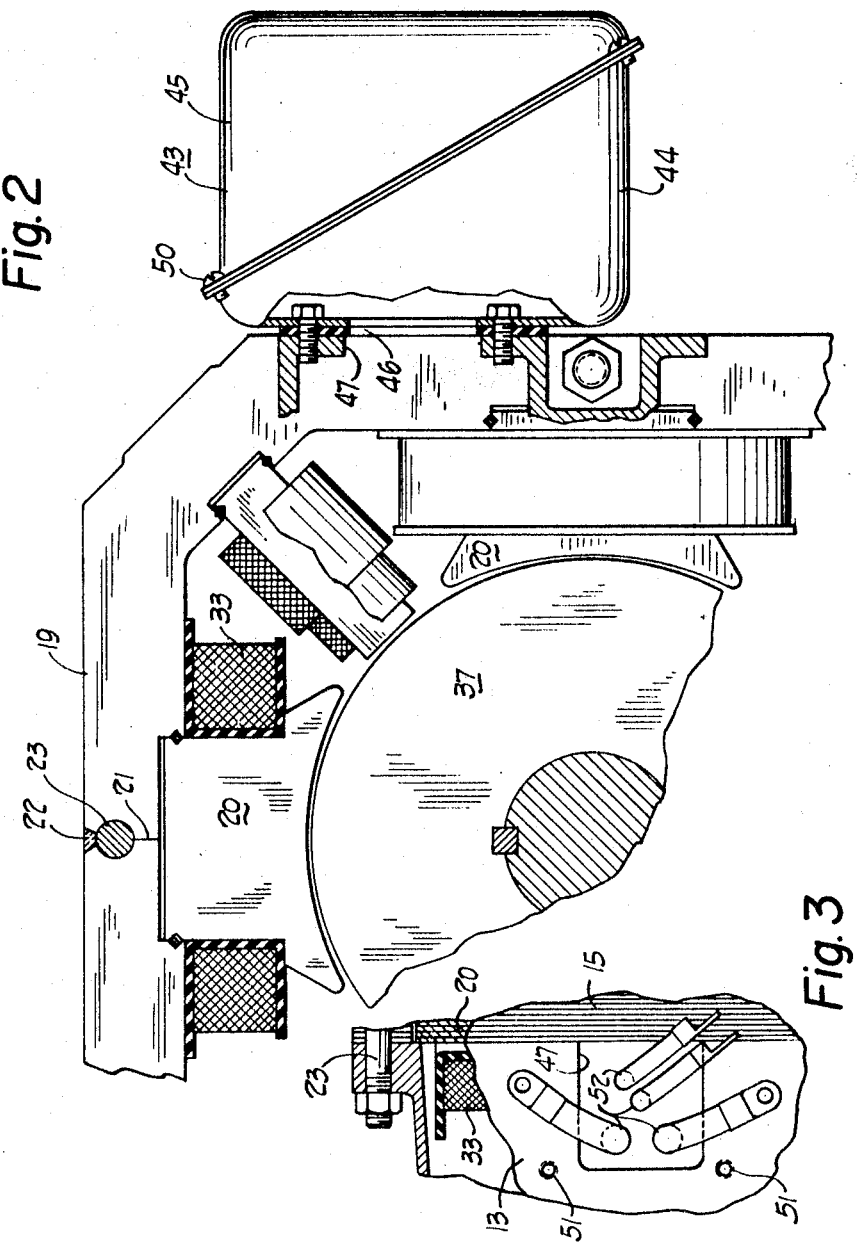

United States Patent Office 3,445,698
Patented May 20, 1969

3,445,698
DYNAMOELECTRIC MACHINE WITH JUNCTION BOX ON YOKE AND END BELL
Albert J. Miko, South Euclid, Ohio, assignor to The Reliance Electric and Engineering Company, a corporation of Ohio
Filed June 29, 1967, Ser. No. 650,064
Int. Cl. H02k 11/00
U.S. Cl. 310—71                                    12 Claims

ABSTRACT OF THE DISCLOSURE

Dynamoelectric machine housing constructions having a junction box for electrical connection to the dynamoelectric machine. A part of the dynamoelectric machine housing is laminated as an annular yoke and end bells are fastened to opposite axial ends of this annular yoke. An aperture is provided from the exterior to the interior of the housing generally adjacent to one annular end of the laminated annular yoke. This aperture is a slot extending into the end bell and a part of the aperture is formed from part of the annular end surface of the yoke. An external junction box covers this aperture and conductors extend from the junction box into the interior of the dynamoelectric machine for connection to the electrical apparatus. This permits the end bell to be removed without disturbing the junction box or the electrical conductors inside.

Background of the invention

The invention relates to a housing construction for a dynamoelectric machine and more particularly to a laminated yoke which may be used on a direct current machine operable on rectified AC current to have a DC component with an AC ripple.

When operating direct current motors with solid state power supplies, severe commutating problems are encountered. This was true with the customary manufacturing technique of a cast iron or rolled steel ring frame forming the annular yoke of the DC motor. Conventional round rolled ring carbon steel field frames do not respond well in the interpolar circuit under rectified power without the use of chokes or without the use of complicated control circuitry to achieve a voltage which has a minimum AC ripple. A laminated field frame design achieves better commutation under rectified power. In the assembly of conventional DC motors with iron or steel annular field frame and solid iron or steel end bells, it was typical to make the annular field frame or yoke of greater axial length than the axial length of the pole pieces which carried the field coils. In such case, the annular field frame was of a solid metal having a longer axial length than the axial length of the field coils. Accordingly, it was common practice to place an aperture directly in the annular field frame extending from the exterior to the interior of the housing construction and hence this aperture provided access for the terminal leads to the dynamoelectric machine. These leads were necessary for the field coils and the armature windings via the commutator.

In laminated yoke construction for DC motors, in order to improve the commutation and to improve the efficiency of the motor operating with a DC component having an AC ripple, it is desirable to have the laminations identical and it is advantageous to not have any aperture in the laminations from the exterior to the interior of the machine housing.

Accordingly it is an object of the present invention to obviate the above-mentioned disadvantages of an aperture in the laminations for the electrical conductors and to obviate the necessity of the annular yoke or field frame extending longitudinally beyond the ends of the pole pieces.

Another object of the invention is to provide a junction box for the housing of a dynamoelectric machine which will readily permit the end bell of the machine to be removed without disturbing the electrical connections.

Another object of the invention is to provide an annular yoke or the field frame of a dynamoelectric machine which is of no greater axial length than required for carrying the flux in the field pole pieces and yet the housing construction readily permits an aperture for the terminal leads to the interior of the machine.

Summary of the invention

The invention may be incorporated in a housing construction for a dynamoelectric machine having an axis, comprising, in combination, an annular yoke, said annular yoke having an end surface substantially perpendicular to the axis of the machine, a pole piece extending inwardly from said yoke toward said axis, an end bell of metal, means removably fastening said end bell on said end surface of said annular yoke, means journalling a rotor in said end bell on said axis for cooperation with said pole piece, a coil surrounding said pole piece, an aperture extending from the exterior to the interior of the housing construction adjacent the engagement surface of the end bell fastened to the adjoining end surface of said annular yoke, a junction box having a bottom portion, means to attach said junction box bottom portion on the outside of said annular yoke covering said aperture in the end bell and attached to said end bell or to said annular yoke, and terminal leads extending from said junction box into said dynamoelectric machine including connections to said coil on said pole piece.

Other objects and a fuller understanding of the invention may be had by referring to the following description and claims, taken in conjunction with the accompanying drawing.

Description of the drawing

FIGURE 2 is a transverse sectional view of the machine of FIGURE 1;
and
FIGURE 3 is a partial elevational view, with the junction box removed to show the slot in the end bell.

Description of the preferred embodiment

Figure 1:
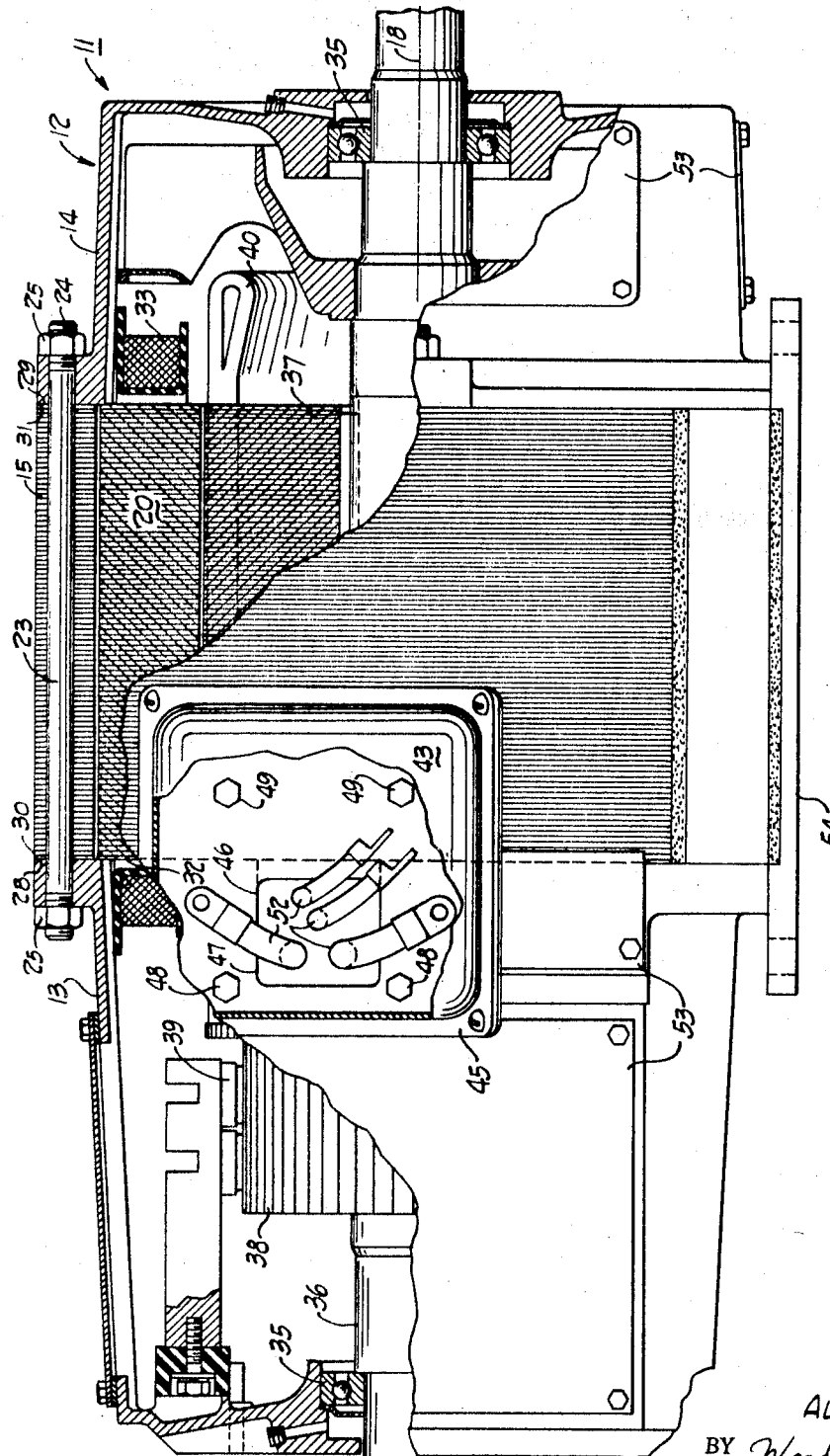
FIGURE 1 is a longitudinal view partly in section of a dynamoelectric machine embodying the present invention.

The preferred embodiment of the invention is illustrated in FIGURES 1 and 2 of the drawing by a dynamoelectric machine 11. This machine 11 has a housing 12 which includes generally a first end bell 13, a second end bell 14 and an annular field frame or yoke 15. The housing 12 has an axis 18. The field frame or annular yoke 15 is laminated from lamination segments 19 which extend circumferentially in the direction of flux flow. These lamination segments may be proportional to the number of poles in the motor or machine 11, and in this preferred embodiment, four main pole pieces 20 are shown, merely by way of example. Accordingly, four lamination segments 19 are used and butt joined end to end along parting lines 21. These lamination segments 19 are welded at 22 to form a complete annular lamination and then a plurality of these annular laminations are stacked side by side to form the annular yoke 15. The welds 22 may also weld into the frame construction rods 23 the ends of which are threaded at 24 to receive nuts 25, fastening the end bells 13 and 14 to the opposite axial end surfaces of the annular yoke 15.

The yoke 15 has first and second annular end surfaces 28 and 29 which are perpendicular to the axis 18 and which are abutted by engagement surfaces 30 and 31 on the end bells 13 and 14, respectively.

The laminated annular yoke 15 is preferably of the same axial length and no longer than the laminated pole pieces 20, so that the axial ends 32 of the pole pieces 20 are planar and coextensive with the planar end surfaces 28 and 29. A field coil 33 surrounds each pole piece 20, and accordingly the axial ends of such field coils extend axially beyond the planar end of the pole piece 20 and the planar end surfaces 28 and 29, and accordingly extend into the dished end bells 13 and 14, respectively. By this construction, the axial length of the annular yoke 15 need be no longer than the axial length of the pole pieces 20. This saves on magnetic material and especially laminated magnetic material so that it is not required to be used in those places where it is not needed to carry flux.

The end bells 13 and 14 carry bearings 35 journalling a shaft 36 to which a rotor or armature 37 is keyed. This rotor 37 cooperates with the pole pieces 20. The rotor 37 also carries a commutator 38 and brushes 39 conduct electrical energy from the stationary portion of the machine to rotor windings 40 on the rotor or armature 37.

The electrical connections from the exterior to the interior of the housing construction 12 are provided for in a junction box 43 having a bottom portion 44 and a cover portion 45. An aperture 46 is provided in the housing construction from the exterior to the interior thereof and this aperture is adjacent the annular end surface 28 of the annular yoke 15. The junction box 43 is attached by machine screws 48 threaded into tapped holes 51 in the end bell 13 and is also attached by similar machine screws 49 threaded in tapped holes in the annular yoke 15. The cover portion 45 is attached to the bottom portion 44 by screws 50 so that the cover 45 may be readily removed for access to the terminal leads 52. These may be the usual terminal leads extending to the field coils 33 and to the armature 37 via the commutator 38. In this preferred embodiment the aperture 46 is formed partly by a portion of the annular end surface 28 and partly by a slot 47 extending axially into the end bell 13. This makes the aperture 46 directly adjacent or contiguous to the yoke end surface 28.

The end bells 13 and 14 may be of solid metal and may also have inspection holes covered by inspection or cover plates 53. For access to the terminal leads 52 in order to make electrical connection to the machine 11, the screws 50 may be removed to remove the cover 45. Usually such exterior electrical connection is made through metallic conduit flexible or thin wall and such connection is not shown in the drawing.

For inspection or repair of the machine 11, it may be necessary to remove the end bell 13. In such case, the machine screws 48 may be removed and then the nuts 25 removed fastening the end bell 13 to the yoke 15. The end bell 13 may then be removed axially exposing the respective end of the armature, and this does not disturb any of the electrical connections in the junction box 43, because this junction box remains attached to the yoke 15. This removal is permitted even though the principal part of the aperture 46 is in the end bell 13. Also the end bell 13 may be removed because the foot bars 54 mounting the entire machine 11 are fastened to the annular yoke 15, but not to the end bells 13 and 14.

In the prior art construction of a solid metal field frame or annular yoke carrying the pole pieces, it was typical construction to put the terminal lead aperture in a portion of the annular yoke extending axially beyond the ends of the pole pieces. This meant that the annular yoke or field frame was axially longer than necessary to carry the flux between the pole pieces. In the present construction, this added length of the field frame is eliminated. Also the aperture 46 for the terminal lead is provided in the end bell 13 which end bell also journals the rotor 37.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts and steps may be resorted to without departing from the spirit and the scope of the invention as hereinafter claimed.

What is claimed is:

1. A housing construction for a dynamoelectric machine having an axis, comprising, in combination:
   an annular yoke,
   said annular yoke having an end surface substantially perpendicular to the axis of the machine,
   a pole piece extending inwardly from said yoke toward said axis,
   an end bell of metal,
   means removably fastening said end bell on said end surface of said annular yoke,
   means journalling a rotor in said end bell on said axis for cooperation with said pole piece,
   a coil surrounding said pole piece,
   an aperture extending from the exterior to the interior of the housing construction adjacent the engagement surface of the end bell fastened to the adjoining end surface of said annular yoke,
   a junction box having a bottom portion,
   means to attach said junction box bottom portion on the outside of said annular yoke covering said aperture in the end bell and attached to said end bell or to said annular yoke,
   and terminal leads extending from said junction box into said dynamoelectric machine including connections to said coil on said pole piece.

2. A housing as set forth in claim 1 including an annular end surface on said annular yoke,
   and said engagement surface departing from the annulus of said end surface so that said aperture is formed partly by said end bell and partly by a portion of said annular surface.

3. A housing as set forth in claim 2 wherein said departure is in an axial direction.

4. A housing as set forth in claim 1 wherein said aperture is a slot in said end bell extending in from said end bell engagement surface, whereby said end bell may be removed from said annular yoke without disturbing said terminal leads extending from said junction box into said dynamolectric machine.

5. A housing as set forth in claim 1 including an open bottom portion on said junction box generally coextensive with said aperture to receive said terminal leads therethrough.

6. A housing as set forth in claim 1 including a cover portion on the side of said junction box opposite to said first bottom portion,
   and means to removably secure said cover portion to said junction box for access to said terminal leads.

7. A housing as set forth in claim 1 including a laminated frame as said annular yoke,
   said laminations being magnetically permeable to establish a flux path in said annular yoke to said pole piece and said laminations extending to said end surface of said annular yoke.

8. A housing as set forth in claim 1 wherein said end surface is a planar annular end surface,
   said aperture includes a slot in said engagement surface of said end bell,
   and said engagement surface of said end bell being a planar surface annular except for said slot aperture.

9. A housing as set forth in claim 1 including a substantially annular engagement surface on said end bell,
   said engagement surface being annular except for said aperture, said coil having an end extending beyond the end surface of said annular yoke, and said end bell being dished to receive said end of said coil which extends beyond the perpendicular end surface of said annular yoke.

10. A housing as set forth in claim 1 including a slot as said aperture extending into said end bell from the engagement surface thereof engaging said annular yoke, removable means to attach said junction box to said annnular yoke, second removable means to attach said junction box to said end bell, and said second attachable means being removable so that said end bell may be removed from said annular yoke by removing said fastening means while retaining said junction box attached to said annular yoke and without disturbing said terminal leads from the dynamoelectric machine into said junction box.

11. A housing as set forth in claim 1 including a second end bell on the opposite axial end of said annular yoke, said first end bell having said engagement surface interrupted by said aperture as a slot extending into said first end bell, and means journalling a rotor in said two end bells on said axis.

12. A housing as set forth in claim 1 including a direct current motor as said dynamolectric machine, said annular yoke being laminated with the laminations extending in a circumferential direction, a plurality of laminated pole pieces extending radially inwardly from said yoke toward said rotor for cooperation therewith, said pole pieces having planar ends substantially coextensive with said yoke end surface which is planar, a second end bell removably fastened on the opposite axial end of said annular yoke, said rotor being journalled in said two end bells, a coil surrounding each of said pole pieces with an end of each coil extending beyond said planar ends of the pole pieces and into the space within the first end bell, said end bells being of solid metal, said aperture having as one boundary surface thereof said annular end surface on said annular yoke and having as another boundary surface thereof a portion of said end bell departing axially from said annular end surface, said junction box having an aperture in the bottom portion thereof substantially coinciding with said aperture from the exterior to the interior of the housing construction, and said junction box having a cover portion attachable to the upper end of the junction box bottom portion.

References Cited

UNITED STATES PATENTS

| | | | |
|---|---|---|---|
| 1,866,344 | 7/1932 | Brown | 310—71 |
| 2,590,559 | 3/1952 | Miller | 310—71 |
| 2,982,873 | 5/1961 | Simmons et al. | 310—258 |
| 3,350,586 | 10/1967 | Otto | 310—71 |

WARREN E. RAY, *Primary Examiner.*

U.S. Cl. X.R.

310—89